United States Patent [19]

Altman et al.

[11] Patent Number: 5,034,173

[45] Date of Patent: Jul. 23, 1991

[54] METHOD OF MANUFACTURING A PLASTIC MOTOR VEHICLE DOOR

[75] Inventors: Gary F. Altman, East Lansing; Mark A. Cunningham, Mason, both of Mich.

[73] Assignee: General Motors Corporation, Detroit, Mich.

[21] Appl. No.: 515,131

[22] Filed: Apr. 26, 1990

[51] Int. Cl.⁵ ...................... B29C 45/13; B29C 45/14
[52] U.S. Cl. .................................. 264/102; 264/255; 264/257; 264/273; 425/543; 425/110
[58] Field of Search ............... 264/102, 240, 250, 255, 264/257, 258, 273, 328.6, 328.8, 328.13; 425/543, 110

[56] References Cited

U.S. PATENT DOCUMENTS

| | | | |
|---|---|---|---|
| 4,290,235 | 9/1981 | Jahnle et al. | 49/502 |
| 4,610,835 | 9/1986 | Ghavamikia | 264/257 |
| 4,648,208 | 3/1987 | Baldamus et al. | 49/502 |
| 4,692,291 | 9/1987 | Angell | 264/255 |
| 4,702,040 | 10/1987 | Hellriegel | 49/502 |
| 4,711,052 | 12/1987 | Maeda et al. | 49/502 |
| 4,714,575 | 12/1987 | Preston | 264/257 |
| 4,810,444 | 3/1989 | Alberino | 264/257 |
| 4,831,710 | 5/1989 | Katoh et al. | 29/434 |
| 4,957,684 | 9/1990 | Kia | 264/257 |

*Primary Examiner*—Jay H. Woo
*Assistant Examiner*—Jeremiah F. Durkin, II
*Attorney, Agent, or Firm*—R. W. Tung

[57] ABSTRACT

A two-staged or sequential reaction injection molding (RIM) method of manufacturing a glass fiber mat reinforced plastic part having at least one appearance surface in which a high viscosity RIM material and a low viscosity RIM material are sequentially injected into a mold cavity containing at least one reinforcing member of a glass fiber mat.

5 Claims, 4 Drawing Sheets

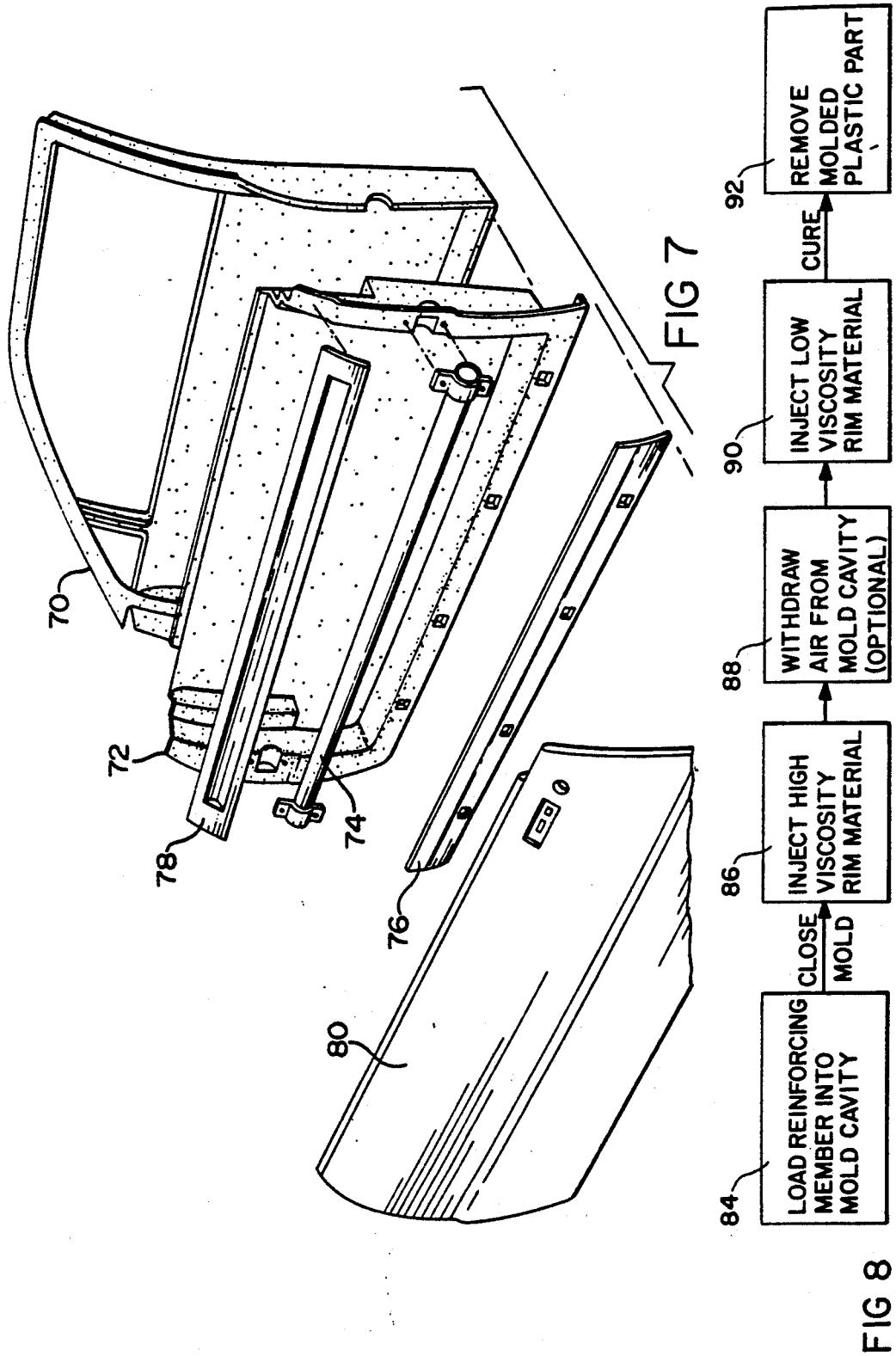

METHOD OF MANUFACTURING A PLASTIC MOTOR VEHICLE DOOR

The present invention relates to a method of manufacturing a motor vehicle door and more particularly to a method of manufacturing a door including a composite plastic structural inner panel having an integrally reinforced window frame.

BACKGROUND OF THE INVENTION

It is known to construct motor vehicle doors from an inner panel and an outer panel which are spaced apart to define a cavity in which window regulators, door latches and other mechanisms are mounted. Such doors typically have a window frame which surrounds a window opening.

Prior patents have disclosed door constructions in which either or both of the panels were constructed of molded synthetic resin plastic parts.

One shortcoming of the use of plastics in the construction of vehicle doors is that the plastic material has somewhat limited strength which necessitates the use of metal or glass fiber reinforcements.

Another shortcoming of the use of plastic in vehicle doors is that plastic materials which have reinforcements therein tend to provide a poor surface finish for subsequent painting, while materials which have high surface quality for subsequent painting may have insufficient strength for the structural requirements of the vehicle door.

The present invention provides a new and improved method of making a vehicle door uniquely constructed and configured to provide both high strength and good surface finish for subsequent painting.

According to the invention, a vehicle door includes an outer panel and an inner panel of molded synthetic resin construction can be manufactured. The inner panel has a structural lower portion concealed beneath the outer panel and an upper portion integral with the lower portion and defining a window frame surrounding a window opening. A tubular reinforcement member of generally inverted U shape is embedded in the upper portion of the inner panel and has leg portions extending downwardly from the upper portion and embedded in the structural lower portion so that the structural lower portion connects the leg portions of the upper portion. The tubular member is a continuous hollow tube formed to have varying cross sectional shape along the continuous length to fit within the shape of the window frame. The synthetic resin of the upper portion is a reinforced reaction injection molded (RRIM) material providing a finished surface for painting and the synthetic resin of the lower portion is a structural reaction injection molded (SRIM) material providing relatively high strength and having a glass fiber mat embedded therein to span between the legs of the tubular member and facilitate bonding between the resin materials of the upper and lower portions.

A copending application, Ser. No. 07/445,248 filed Dec. 4, 1989 now U.S. Pat. No. 4,945,602 by the present inventors assigned to the common assignee disclosed and claimed the novel structure of a motor vehicle door.

Accordingly, the object, feature, and advantage of the invention resides in the provision of a new and improved plastic vehicle door including an inner panel having a tubular reinforcement member of inverted U-shape embedded in the upper portion to define a window opening and having leg portions extending downwardly and embedded in a structural lower portion.

Another feature, object, and advantage of the invention resides in the provision of a tubular member embedded in the window frame forming portion of a molded plastic door panel and having varying cross sectional shape along the length thereof to fit within the cross section of the window frame.

A still further feature, object, and advantage of the invention resides in the provision of an inner panel for a vehicle door having an integrally molded upper portion defining a window opening and providing a finished surface for painting and having a lower portion of structural molded material with a glass fiber mat embedded therein.

A still further feature, object, and advantage of the invention resides in the provision of a vehicle door panel comprised of upper and lower portions with a tubular metal reinforcement embedded in the upper portion and glass fiber mat embedded in the lower portion and spanning between the upper and lower portions and extending between the spaced apart legs of the tubular reinforcement member.

A still further feature, object and advantage of the invention resides in the provision of a two-staged or sequential reaction injection molding (RIM) method of manufacturing a glass fiber mat reinforced plastic part having at least one appearance surface in which a high viscosity RIM material and a low viscosity RIM material are sequentially injected into a mold cavity containing at least one reinforcing member of a glass fiber mat.

BRIEF DESCRIPTION OF THE DRAWINGS

These and other features, objects and advantages of the invention will become apparent upon consideration of the description of the preferred embodiment and the appended drawings in which:

FIG. 7 is an exploded perspective view of a second embodiment of the plastic door of this invention.

FIG. 8 is a process flow chart showing the processing steps of the sequential reaction injection molding method.

DESCRIPTION OF THE PREFERRED EMBODIMENT

Figure 1:
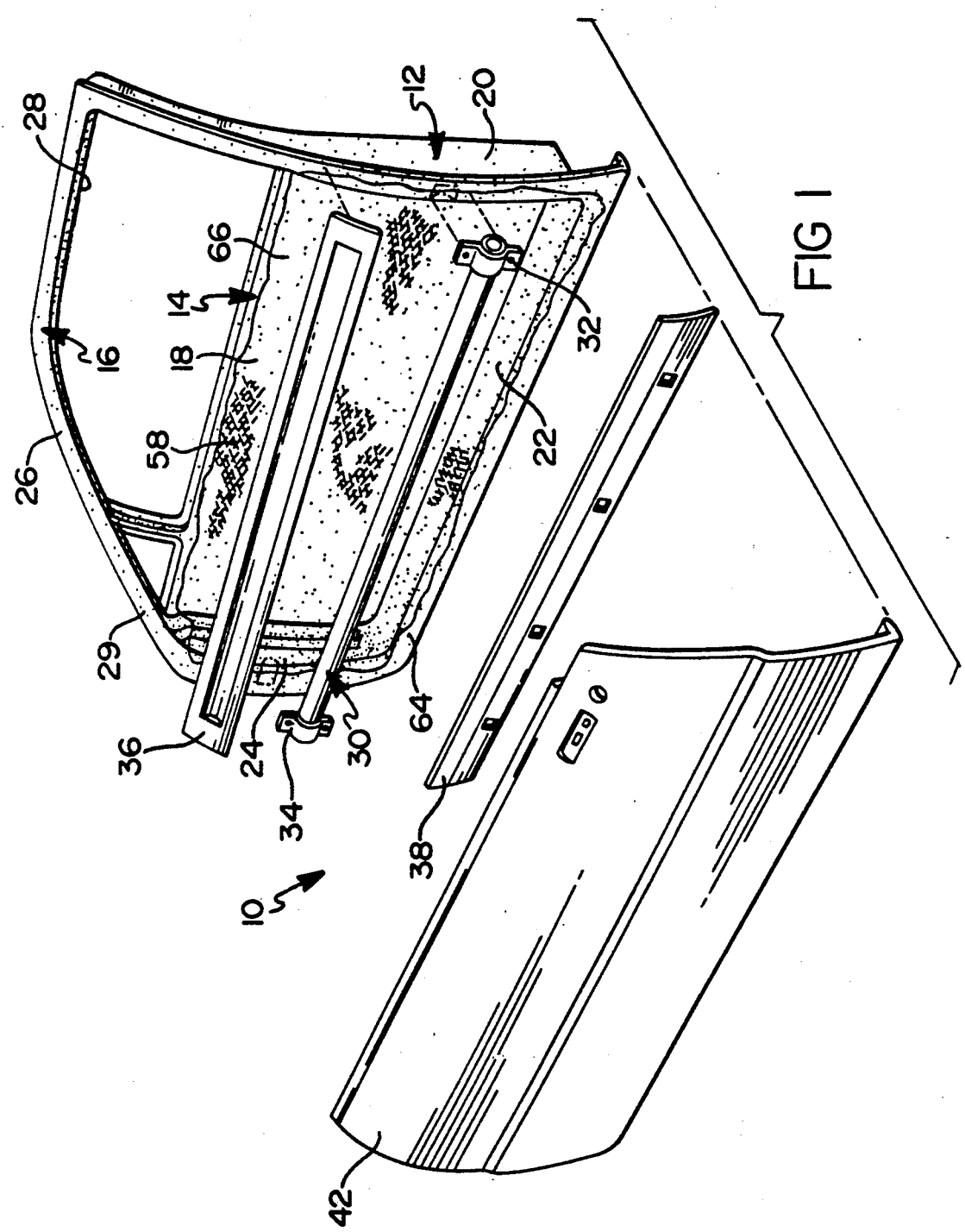
FIG. 1 is an exploded view of a plastic vehicle door according to the present invention.

Referring to FIG. 1, it is seen that the vehicle door 10 includes a door inner panel 12 including a lower portion 14 and an upper portion 16. The lower portion 14 includes a generally planar panel 18 having an integral rearward wall 20, lower wall 22 and forward wall 24 which project laterally from the planar portion 18. The upper portion 16 of the inner panel 12 is a window frame 26 which extends from the forward wall 24 rearwardly to the rear wall 20 and cooperates with the planar portion 18 to define window opening 28. The door inner panel 12 also includes a flange lip 29 which extends continuously around the perimeter of the window frame 26, and the rearward wall 20, lower wall 22 and forward wall 24.

The door inner panel 20 of FIG. 1 is of molded synthetic plastic resin construction which is injection molded as will be further described hereinafter. The door 10 of FIG. 1 also includes a side impact tube 30 having a rear end attached to the rearward wall 20 by bracket 32 and a forward end attached to the forward wall 24 by a bracket 34. In addition, an upper reinforcement bar 36 and a lower reinforcement bar 38 extended between the rearward wall 20 and forward wall 24 and are suitably attached by adhesives or fasteners.

A door outer panel 42, also preferably of a molded synthetic plastic resin construction is provided for attachment over the outside of the flange lip 29 of inner panel 12 and forms the outer surface of the door. The door hardware such as window regulators, door latches, door handles, and other components are attached to the inner panel 12 before the outer panel 42 is secured to the inner panel 12.

Figure 2:
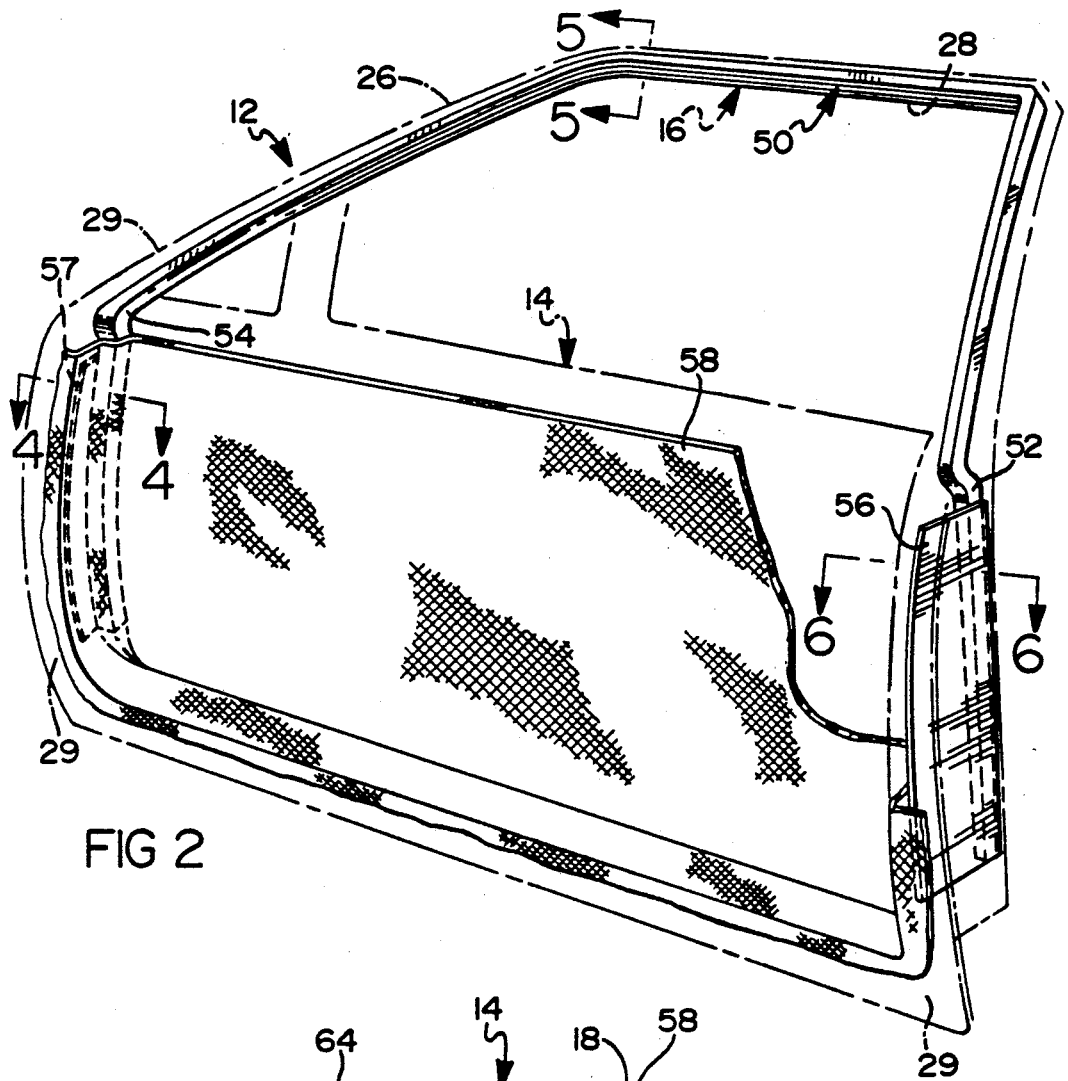
FIG. 2 is a perspective view of the door inner panel showing the tubular member with a sheet of glass fiber mat overlying the legs or tubular member prior to the injection of the resin materials.

Referring to FIG. 2, a tubular reinforcing member 50 is bent to an inverted U shape and has a rearward leg 52 and a forward leg 54 which extend downwardly. A mounting plate 56 is welded to the rearward leg 52 and facilitates the subsequent attachment of the door latch to the door. A mounting plate 57 is welded to the forward leg 54 and facilitates the attachment of the door hinges to the door. The tubular reinforcing member 50 is a continuous metallic hollow tube which is formed to have varying cross sectional shape along the continuous length thereof. Reference may be had to U.S. Pat. No. 4,567,743 for a discussion of the method by which such formed tubing is manufactured. The tubing is commercially available from TI Automotive Division of TI Canada, Inc.

It should be emphasized that the tubular reinforcing member is suitable and necessary only for the specific vehicle door part illustrated. Our novel two-staged or sequential RIM process can be used to manufacture other plastic parts that do not require a tubular reinforcing member. In other plastic parts, a glass fiber mat may be the only reinforcing member that is necessary.

Figure 4:
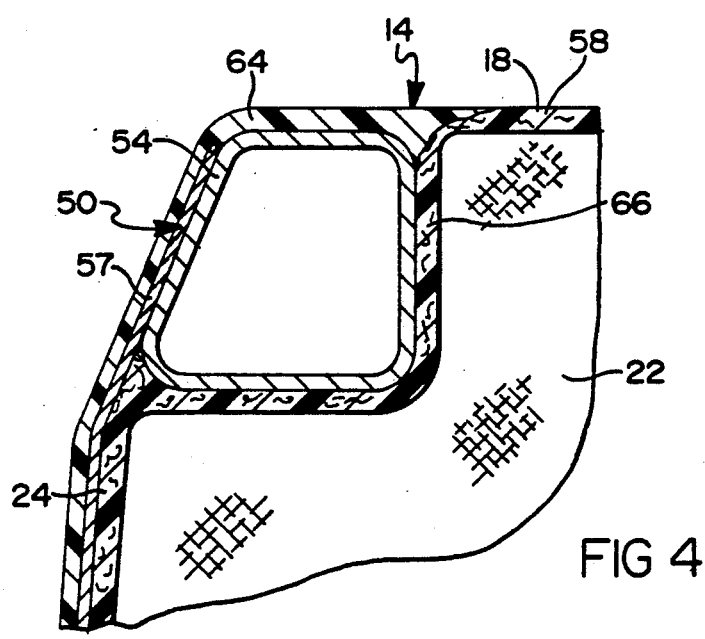
FIG. 4 is a sectional view taken in the direction of arrows 4—4 of FIG. 2.
Figure 3:
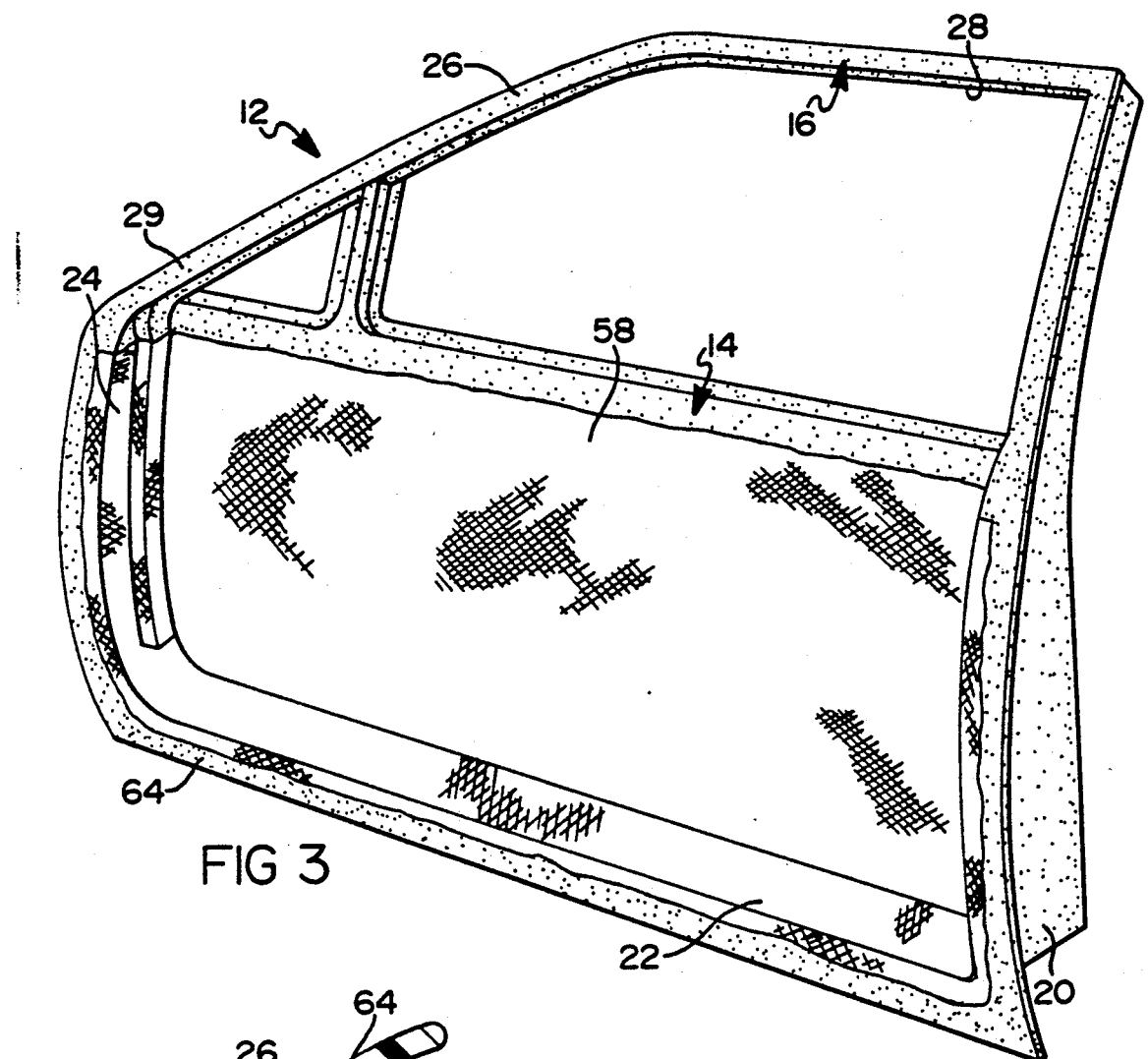
FIG. 3 is a perspective view of the door inner panel shown as molded.
Figure 5:
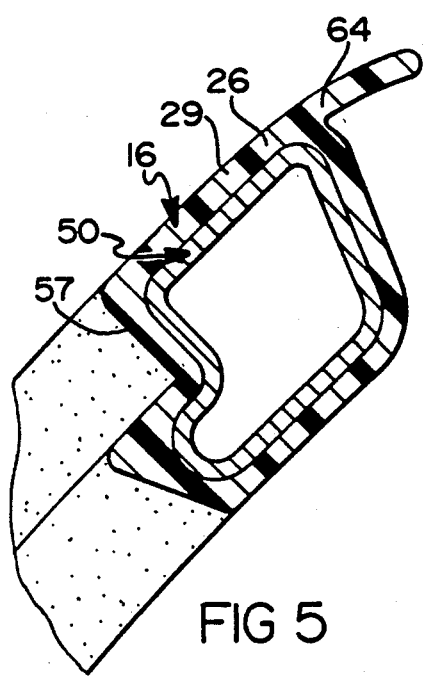
FIG. 5 is a sectional view taken in the direction of arrows 5—5 of FIG. 2.
Figure 6:
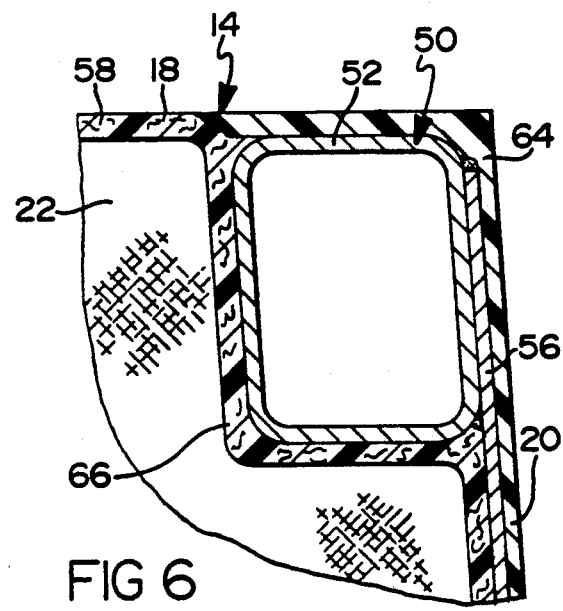
FIG. 6 is a sectional view taken in the direction of arrows 6—6 of FIG. 2.

As seen in FIG. 4 the forward leg 54 of the tubular reinforcing member 50 has a trapezoidal cross sectional shape which fits advantageously within the cross section of the door at the leading edge of the door. As seen in FIG. 5, the tubular reinforcing member 50 at window frame 26 has a complex cross section which facilitates the provision of a recess 57 for mounting a glass run channel. FIG. 6 shows the rectangular cross section of the rearward leg 52 of tubular reinforcing member 50 at the rear corner of the door.

Our novel sequential reaction injection molding process is shown in a flow chart in FIG. 8.

In order to mold the door inner panel 12, the preformed tubular reinforcing member 50 is placed in a plastic injection mold. A sheet of non-woven glass fiber 58 is also placed in the mold. This is shown in FIG. 8 as 84. The sheet of non-woven glass fiber 58 is large enough to reach substantially the full expanse of the planar portion 18 of the inner panel 12 so that it reaches fore and aft and overlays the depending legs 52 and 54 of the tubular reinforcement member 50 as shown in FIG. 2. The sheet of woven glass fiber 58 also extends into the region of the rearward wall 20, lower wall 22 and forward wall 24, and part way into the region of the flange lip 29 as shown in FIG. 2. A suitable non-woven glass fiber mat material is a four-layered 1.5 oz. material with thermoplastic binder commercially available from Certain Teed, grade U-750.

A synthetic resin reaction injection molding material such as urethane or urea is injected into the mold via high pressure impingement mixing with isocyanate and polyol, and is preferably reinforced with chopped flake glass. This is shown in the process flow chart as 86 in FIG. 8. This material is highly viscous and is injected into the region of flange lip 29. This reinforced reaction injection molded material RRIM, designated 64 in FIGS. 3, 4, 5 and 6, flows around the tubular member 50 and also flows around the entire periphery of the lower portion 14 of the door inner panel 12. Because this RRIM material is highly viscous, i.e., as high as one or two orders of magnitude higher than the viscosity of the SRIM material, the RRIM material flows only a small distance into the region of the sheet of glass fiber 58, thereby bonding with the edge of the sheet or woven glass fiber 58.

One suitable RRIM material we have used is commercially available from Mobay under the trade name of MONDUR 110-80 IMR containing 21 volume percent flake glass. The room temperature viscosity of this material prior to mixing are Part A (isocyanate) 700 centipoise and Part B (polyol) 13,000 centipoise. We believe that any other RRIM materials in a similar viscosity range may also be suitably used.

The reaction injection equipment we have used is a 75 ton Cincinnati Milacron RIM clamp and injection unit. The Mobay material was run at 120° F. ± 10° F. for the polyol and 105° F. ± 5° F. for the isocyanate, injected at a rate of 4 to 5 pounds per second at 1800 + 300 psi pressure on both the polyol and isocyanate. The temperature of the mold was kept at 170° F. ± 10° F.

Immediately after the injection of the RRIM material, the air in the mold cavity is withdrawn by a vacuum pump to a pressure of no more than 20 inches of mercury. This is shown as 88 in FIG. 8. This is a preferred, even though not absolutely necessary, step for our novel two-stage or sequential RIM process. It improves the penetration of the second injection process, i.e., the SRIM injection, into the nonwoven glass fiber mats. We believe that the improved penetration also improves the bonding between the SRIM and the RRIM material and, therefore, improves the overall quality of the molded part.

Immediately after the RRIM injection or after air is withdrawn from the mold cavity material, a structural reaction injection molded material (SRIM) is injected into the mold at the lower portion 14 to complete the filling of the mold cavity. This is shown in the process flow chart as 90 in FIG. 8. This SRIM material, designated 66 in FIGS. 1, 4, and 6, is less viscous than the RRIM material and penetrates throughout the sheet of non-woven glass cloth 58 and melds into the earlier injected RRIM material.

We have used several polyurethane SRIM materials which produced satisfactory results. These materials are listed in the following Table.

TABLE I

| Manufacturer | Designation | Viscosity, (Centipoise at Room Temperature) | |
|---|---|---|---|
| | | Isocyanate | Polyol |
| Dow | SPECTRIM ®-MM-310 | 180 | 300 |
| Mobay | MONDUR ®-400 | 50 | 175 |
| ICI | GMR-5000 | 47 | 500 |

It is seen from Table I that the room temperature viscosities of our SRIM materials are significantly lower than that of the RRIM materials, i.e., often by one or two orders of magnitude.

The polyol and isocyanate for the SRIM materials were kept at room temperatures of 75° F. ± 5° F. The SRIM material was injected with a commercial Venus RTM unit at a rate of about 0.5 pounds per second and at less than 1000 psi on both the polyol and isocyanate.

A typical vehicle door molding sequence is as follows:

1. Place steel header tube or other reinforcing members in the mold.
2. Place 1" wide glass mat strips around the tool tray periphery, except for the bottom (alternate embodiment in FIG. 7).
3. Place glass mat in the mold on top of the tube and glass mat strips.
4. Close the mold.
5. Inject the RRIM material forming the class "A" surface for the door header and surrounding the tool tray area.
6. Pull a vacuum in the tool tray area immediately after injecting the RRIM. No RRIM cure time is required before the vacuum is started. (An optional step.)
7. Inject the SRIM material.
8. Cure. Cure time varied between one (1) to four (4) minutes.
9. Open mold.
10. Eject door.

After the door is removed from the mold as shown in the process flow chart as 92 in FIG. 8, any flash may be easily removed from the molding as the RRIM material 64 extends all around the flange lip 29 of the door inner panel 12 and is relatively easier to cut than is the SRIM material 66. Referring again to FIG. 1 will be appreciated that the RRIM material is painted to match the exterior color of the car and becomes the appearance surface of the door at the window frame 26.

Referring to FIGS. 4 and 6 it is noted that the RRIM material 64 and the SRIM material 66 are shown as separate moldings, however, in actual practice it has been found that the sequentially injected materials will have substantially flowed together prior to cure the RRIM material so that both a mechanical and chemical bond acts between the two materials.

The lower portion 14 of the door, which is comprised of SRIM materials, is structurally strong and dimensionally stable. The lower portion 14 of SRIM need not be painted as it is concealed beneath the outer panel 42. The embedment of the sheet of woven glass fiber 58 within the lower portion 14 ridgidifies the lower portion and also spans between the rearward leg 52 and forward leg 54 to substantially strengthen the door by maintaining the spacing between the legs.

FIG. 7 shows an alternate embodiment of the invention in which the door inner panel assembly is comprised of a inner panel 70 and a component tray 72, which are separately constructed of molded synthetic plastic resin and then bonded or otherwise suitably fastened together. The side impact tube 74 and the lower reinforcement 76 and upper reinforcement 78 are suitably attached to the component tray 72. The window regulator would be attached to the component tray 72. The door outer panel 80 is attached to the component tray 72 after the other components have been attached.

Thus it is seen that the invention provides a new and improved method of making vehicle body door comprised of reaction injected materials.

The embodiments of the invention in which an exclusive property or privilege is claimed are defined as follows:

1. In a sequential reaction injection molding method of manufacturing a glass fiber mat reinforced plastic part having at least one appearance surface in which a high viscosity reaction injection molding material and a low viscosity reaction injection molding material are sequentially injected into a mold cavity containing at least one reinforcing member of a glass fiber mat, said method comprising the steps of:

loading said at least one reinforcing member of a glass fiber mat into said mold cavity;

injecting a first reaction injection molding material at room temperature into said mold cavity forming said at least one appearance surface, said first reaction injection molding material having a room temperature viscosity too high to substantially penetrate through said at least one reinforcing member of a glass fiber mat;

injecting a second reaction injection molding material at room temperature into said mold cavity to substantially penetrate through said at least one reinforcing member of a glass fiber mat and causing a bond to be formed between said first and said second reaction injection molding material, said second reaction injection molding material having a lower room temperature viscosity than that of said first reaction injection molding material prior to said injection process;

curing said plastic part in said mold cavity for a sufficient length of time; and demolding said cured part from said mold cavity.

2. In a sequential reaction injection molding method of manufacturing a glass fiber mat reinforced plastic part having at least one appearance surface in which a high viscosity reaction injection molding material and a low viscosity reaction injection molding material are sequentially injected into a mold cavity containing at least one reinforcing member of a glass fiber mat, said method comprising the steps of:

loading said at least one reinforcing member of a glass fiber mat into said mold cavity;

injecting a first reaction injection molding material at room temperature into said mold cavity forming said at least one appearance surface, said first reaction injection molding material having a room temperature viscosity too high to substantially penetrate through said at least one reinforcing member of a glass fiber mat;

withdrawing air from said mold cavity to a pressure of no higher than 20 inches of mercury;

injecting a second reaction injection molding material at room temperature into said mold cavity to substantially penetrate through said at least one reinforcing member of a glass fiber mat and causing a bond to be formed between said first and said second reaction injection molding material, said second reaction injection molding material having a lower room temperature viscosity than that of said first reaction injection molding material prior to said injection process;

curing said plastic part in said mold cavity for a sufficient length of time; and demolding said cured part from said mold cavity.

3. In a sequential reaction injection molding method of manufacturing a glass fiber mat reinforced plastic part having at least one appearance surface in which a high viscosity reaction injection molding material and a low viscosity reaction injection molding material are sequentially injected into a mold cavity containing at least one reinforcing member of a glass fiber mat, said method comprising the steps of:

loading said at least one reinforcing member of a glass fiber mat into said mold cavity;

injecting a first reaction injection molding material at room temperature into said mold cavity forming said at least one appearance surface, said first reaction injection molding material having a room temperature viscosity too high to substantially penetrate through said at least one reinforcing member of a glass fiber mat;

withdrawing air from said mold cavity to a pressure of no higher than 15 in. Mercury;

injecting a second reaction injection molding material at room temperature into said mold cavity to substantially penetrate through said at least one reinforcing member of a glass fiber mat and causing a bond to be formed between said first and said second reaction injection molding material, said second reaction injection molding material having a room temperature viscosity no more than half of that of said first reaction injection molding material prior to said injection process;

curing said plastic part in said mold cavity for a sufficient length of time; and demolding said cured part from said mold cavity.

4. In the method of claim 1, said first and said second reaction injection molding material comprises a polyurethane.

5. In the method of claim 2, said at least one reinforcing member further includes a preformed tubular member of generally inverted U shape defining the window frame of a motor vehicle door.

* * * * *